J. A. ROSS.
SHEEP HOOK.
APPLICATION FILED JAN. 30, 1909.
953,714.
Patented Apr. 5, 1910.
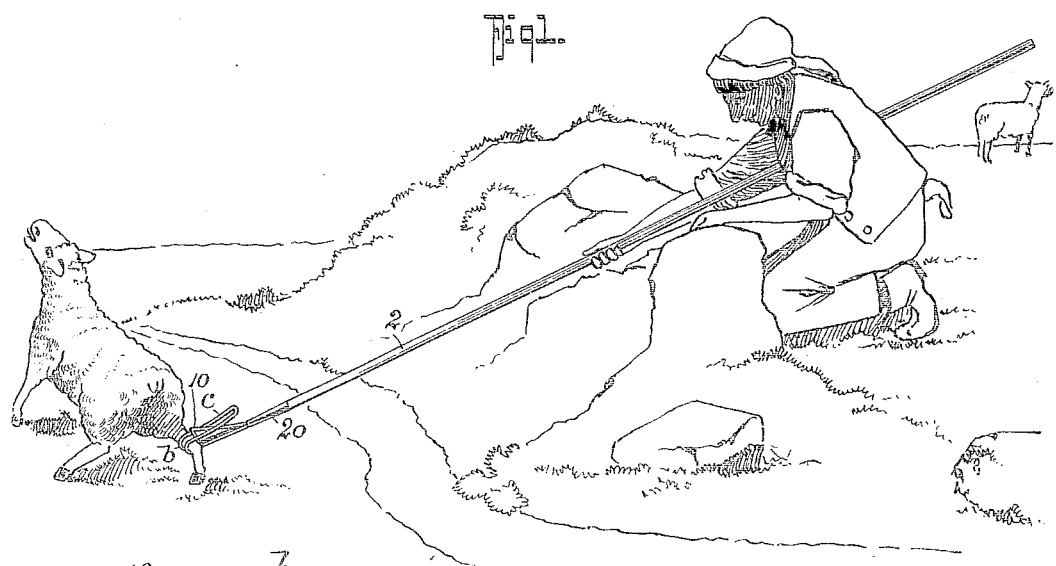
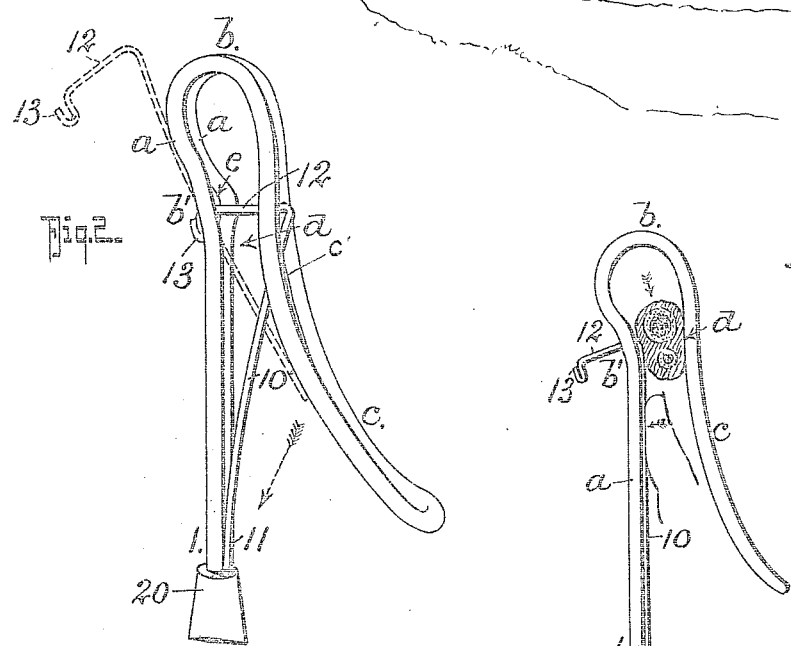
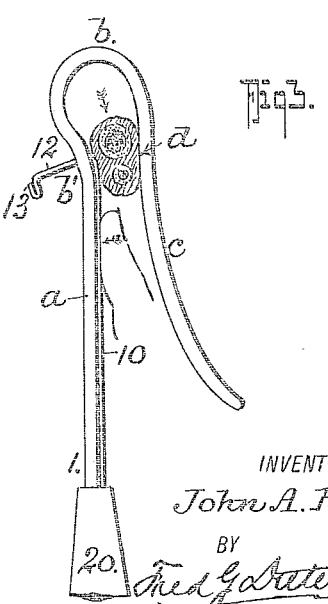
WITNESSES:
J. Theodore Schrott
Charles H. Wagner
INVENTOR
John A. Ross.
BY
Fred G. Dieterich
ATTORNEYS.

UNITED STATES PATENT OFFICE.

JOHN A. ROSS, OF WEISER, IDAHO, ASSIGNOR, BY DIRECT AND MESNE ASSIGNMENTS, OF ONE-THIRD TO BUTTERFIELD LIVE STOCK COMPANY, LTD., OF WEISER, IDAHO, AND ONE-THIRD TO WILLIAM N. McCONNEL, OF CALDWELL, IDAHO.

SHEEP-HOOK.

953,714. Specification of Letters Patent. Patented Apr. 5, 1910.

Application filed January 30, 1909. Serial No. 475,191.

*To all whom it may concern:*

Be it known that I, JOHN A. ROSS, residing at Weiser, in the county of Washington and State of Idaho, have invented a new and Improved Construction of Sheep-Hook, of which the following is a specification.

My invention, which relates to the implement usually employed by sheep herders for catching and controlling sheep, primarily has for its object to provide an implement of the character stated, capable of being quickly and economically designed to provide for easily letting the leg of the sheep into the hook for positively holding the sheep from kicking out of the hook, and at the same time fit about the leg with sufficient freedom so as to not injure the leg or hurt the animal.

With other objects in view that will hereinafter appear, my invention comprehends, in its generic nature, a crook member formed of resilient wire bent to shape to provide a loop and tapering entrance, and a latch member that operates over the entrance to the loop that pushes back when the hook is slipped on the leg to let the leg in the hook, and which automatically closes the entrance of the hook or loop portion, and prevents the said hook from becoming disengaged from the leg until manually released.

In its more subordinate features, my invention consists in certain details of construction and peculiar combination of parts, all of which will be hereinafter described, specifically pointed out in the appended claims, and illustrated in the accompanying drawings, in which:

Figure 1, is a perspective view that illustrates the manner the hook is applied to the sheep's leg. Fig. 2, is a perspective view of the hook, the latch device being at its normal position, and, Fig. 3, is a view that illustrates how the latch is moved back to free the hook from the sheep's leg.

In the practical application of my invention, the crook or hook portion proper is formed of a single strand of spring wire of suitable diameter, that, midway thereof is bent upon itself to provide two parallel and closely held strands, which strands, at their ends, extend straight to form a shank or stem 1 for fitting into a suitable handle 2, having the usual ferrule or tip 20, as best shown in Figs. 2 and 3, by reference to which it will be also seen that the two strands *a—a* are bent to form a loop or hook portion *b* of a diameter to freely engage around the leg of the animal and then curved gradually outward away from the shank 1 to form a guard or guide arm *c*, said arm and the portion *b* being relatively so curved that a restricted entrance or throat *d* is provided between the arm *c* and the base *b'* of the loop *b*, the strands *a—a* at the said point *b'* being separated to form an elongated aperture *e*, the purpose of which will presently appear.

Coöperatively connected with the hook is a latch member that forms an essential feature of my invention, and the same consists of a single strand of spring wire 10, of considerably less diameter than the hook strands, and whose upper end is bent substantially at right angles to the remainder to form a cross head 12 of a width somewhat larger than the width of the throat or entrance *d*, the said wire from the head 12 being curved inwardly and having its lower end 11 extended into the handle 2. By making the cross head 12 wider than the throat the angled edge of the latch is movable between and guided by the two strands *a—a* that form the guard or arm *c*, the said strands at the latch engaging part being slightly separated as at *c'* to accommodate the angle end of the latch therebetween.

To prevent the latch member 10 springing back too far between the arm strands *a—a*, the outer or free end of the cross head 12 is bent laterally to form a finger 13, that rides on the outside of the strands *a—a* at the base *b'* of the loop portion, the end of the latch having free play in the aperture *e* to provide for an easy back thrust of the latch when slipping the hook onto the sheep's leg. Another object in separating the strands *a—a* at the base of the loop *b* to form the aperture *e* is that it provides for readily fitting the bent wire latch in place, which can readily be done by passing the finger or member 12 of the latch through the aperture *e* edgewise, as indicated by dotted lines in Fig. 2.

From the foregoing description, taken in connection with the accompanying drawings, the advantages of my invention and the manner in which it is used will be readily apparent.

Having thus described my invention, what I claim is:

1. As a new article, an implement of the character described, consisting of a crook formed of adjacent parallel wire strands, the strands at the entrance to the leg receiving portion of the crook being separated, and a latch consisting of a spring wire secured at one end to the handle end of the crook, its other end being bent at right angles to form a cross head, said cross head being movably held between the aforesaid separated portions of the strands that form the crook.

2. As a new article, an implement for the purposes described, that consists of a crook portion formed of parallel strands closely held together, and bent upon themselves and shaped to provide an inward tapering entrance, a leg loop and a handle stem, the strands at the entrance to the leg loop being slightly separated, and a latch member formed of a single spring member secured at one end to the handle stem of the crook portion, and normally crossed over the tapering entrance thereof, the outer end of said spring wire being bent at a substantially right angle to form a cross head, the opposite ends of which extend between the separated ends of the crook strands, the outer portion of the cross head terminating in a lateral member, as set forth.

JOHN A. ROSS.

Witnesses:
FRANK HAINS,
BERNARD HAAS.